(12) United States Patent
Mochida

(10) Patent No.: US 12,447,805 B2
(45) Date of Patent: Oct. 21, 2025

(54) DOOR WEATHER STRIP

(71) Applicant: KINUGAWA RUBBER IND. CO., LTD., Chiba (JP)

(72) Inventor: Takaaki Mochida, Chiba (JP)

(73) Assignee: KINUGAWA RUBBER IND. CO., LTD., Chiba (JP)

( * ) Notice: Subject to any disclaimer, the term of this patent is extended or adjusted under 35 U.S.C. 154(b) by 0 days.

(21) Appl. No.: 18/371,322

(22) Filed: Sep. 21, 2023

(65) Prior Publication Data

US 2024/0100926 A1 Mar. 28, 2024

(30) Foreign Application Priority Data

Sep. 22, 2022 (JP) ................................. 2022-150911

(51) Int. Cl.
*B60J 10/86* (2016.01)
*B60J 10/16* (2016.01)
*B60J 10/18* (2016.01)
*B60J 10/24* (2016.01)

(52) U.S. Cl.
CPC .............. *B60J 10/86* (2016.02); *B60J 10/16* (2016.02); *B60J 10/18* (2016.02); *B60J 10/24* (2016.02)

(58) Field of Classification Search
None
See application file for complete search history.

(56) References Cited

U.S. PATENT DOCUMENTS

| 6,601,346 B2* | 8/2003 | Nozaki | B60J 10/25 |
| | | | 49/480.1 |
| 6,814,393 B2* | 11/2004 | Nagata | B60J 10/86 |
| | | | 49/498.1 |
| 2014/0000174 A1* | 1/2014 | Minagawa | B60J 10/86 |
| | | | 49/483.1 |
| 2019/0047391 A1* | 2/2019 | Kamitani | B60J 10/24 |
| 2021/0331568 A1* | 10/2021 | Nishikawa | B60J 10/22 |

FOREIGN PATENT DOCUMENTS

| JP | 2007-069831 A | 3/2007 |
| JP | 2007-320324 A | 12/2007 |
| JP | 4511149 B2 | 7/2010 |

OTHER PUBLICATIONS

Japanese Office Action for Application No. 2022-150911 dated May 7, 2025, 6 pages with English translation.

* cited by examiner

*Primary Examiner* — Marcus Menezes
(74) *Attorney, Agent, or Firm* — Foley & Lardner LLP

(57) ABSTRACT

A door weather strip includes an attachment base part attached to a door sash part. The attachment base part has at least a part made of a hard rubber. The door weather strip includes a hollow seal part made of a soft rubber. The hollow seal part has a base bottom portion disposed so as to come in contact with the outer surface of a door inner panel, and comes in contact with a body outer panel so as to be deflected and deformed in a door closed state. The door weather strip includes a connection part made of soft rubber connecting the base bottom portion of the hollow seal part with the attachment base part and hard rubber buried inside the base bottom portion and connection part.

4 Claims, 5 Drawing Sheets

PRIOR ART

PRIOR ART

DOOR WEATHER STRIP

BACKGROUND

The present invention relates to a door weather strip which is mounted on a door panel of an automobile so as to seal between the door panel and a vehicle body panel.

As a conventional door weather strip, one described in Japanese Patent No. 4511149 (hereinafter is referred to as "JP 4511149 B2") has been known.

FIG. 1 is a side view of a front door of an automobile to which a door weather strip 1 of the present invention or conventional technique is applied. FIG. 4 is a sectional view taken along an A-A line of FIG. 1 which shows the conventional door weather strip 1. FIG. 5 is an illustrative view showing a state in which the conventional door weather strip 1 has been deflected and deformed in one direction.

As shown in FIG. 1, the door weather strip 1 is disposed to the periphery of a front door (hereinafter is referred to as a door) 2 composed of a door main body 3 and a door sash part 4 in a closed loop shape.

As shown in FIG. 4, the conventional door weather strip 1 is disposed at the upper side part of the door sash part 4, and is provided with an attachment base part 6 attached and fixed to an attachment part 5 formed at the door sash part 4, and having a substantially U-shape in cross section, a hollow seal part 8 which comes in elastic contact with a vehicle body panel (body-side outer panel) 7 in a door closed state, and a connection part 9 which connects a base bottom portion 8a of the hollow seal part 8 which is disposed so as to come in contact with the upper surface of the descending portion at a door inner panel 4a of the door sash part 4 and one end portion in the width direction of the attachment base part 6.

The attachment base part 6 has a hollow shape inside thereof, is formed in a substantially rectangular shape in cross section, and is fitted and fixed to the attaching part 5. In addition, at least a part or whole of the attachment base part 6 is made of solid rubber that is a hard rubber so as to ensure rigidity. Further, a sub rip 10 which comes in contact with the body-side outer panel 7 for sealing is provided at the upper end in FIG. 4 of the attachment base part 6 so as to be uprightly stood.

The hollow seal part 8 includes a circular arc portion 8b which is integrally provided on the upper side of the substantially linear base bottom portion 8a disposed so as to come in contact with the upper surface of the door sash part 4, and comes in elastic contact with the body-side outer panel 7 for sealing in a door closed state. In addition, the whole of the hollow seal part 8 is made of sponge rubber which is soft rubber.

The connection part 9 is formed in a short rod shape, and the material of the connection part 9 is sponge rubber which is the same as the hollow seal part 8. One end portion in the width direction of the connection part 9 is connected to the outer end edge on the hollow seal part 8 side of the attachment base part 6, and the other end portion is connected to the outer end edge of the joint part between the base bottom portion 8a and the circular arc portion 8b of the hollow seal part 8.

According to the door weather strip 1, when being attached to the attachment part 5 of the door sash part 4 via the attachment base part 6, the hollow seal part 8 is inclined toward the lower direction by the connection part 9. At this time, since the descending portion is formed at the door inner panel 4a of the door sash part 4, the hollow seal part 8 can be inclined easily. Consequently, the bottoming of the hollow seal part 8 at the time when the circular arc portion 8b comes in contact with the lower end surface of a circular arc portion 7a of the body-side outer panel 7 does not occur, thereby improving sealing performance and door closing performance.

However, in the conventional door weather strip 1 in JP 4511149 B2, the attachment base part 6 is made of solid rubber. In contrast, the hollow seal part 8 and the connection part 9 are made of sponge rubber. Consequently, when, for example, extrusion molding of the door weather strip 1 is carried out, or in a free state after the lapse of a predetermined time after the extrusion molding, there is a possibility that, due to a large foaming ratio of the sponge rubber and the different shrinkage from the solid rubber of the attachment base part 6, as shown in an arrow in FIG. 5, the whole of the door weather strip 1 is expanded in one direction (hollow seal part 8 direction) from a position shown by an alternate long and short dash line toward a position shown by a solid line, and is deflected and deformed in a curved shape. In particular, there is a possibility that the hollow seal part 8 side in which the whole part is made of sponge rubber is deformed in a curved shape in one direction further largely.

Consequently, attachment work of the door weather strip 1 to the attachment part 5 of the door sash part 4 by hand becomes complicated, and attachment work efficiency deteriorates.

In addition, since the hollow seal part 8 and the connection part 9 are made of sponge rubber, and the rigidity of the whole of them is low, in the door closed state, the reaction force from the circular arc portion 8b to the base bottom portion 8a of the hollow seal part 8 becomes small, and a sufficient press contact force between the base bottom portion 8a and the upper surface of the descending portion at the door inner panel 4a of the door sash part 4 cannot be obtained. Consequently, there is a possibility that seal performance between the base bottom portion 8a and the upper surface of the door inner panel 4a deteriorates.

The present invention is made in consideration of such a technical problem, and an object of the present invention is to provide a door weather strip which is capable of suppressing deterioration of attachment work efficiency and seal performance to a door panel by suppressing the curve-shaped deflection and deformation of the door weather strip at the time of, for example, extrusion molding, and suppressing the reduction of the seal pressure between a base bottom portion of a hollow seal part and a door panel.

SUMMARY

A door weather strip of the present invention includes: an attachment base part which is attached to a door panel of a vehicle, and has at least a part made of a hard rubber; a hollow seal part which is made of a soft rubber, has a base bottom portion disposed so as to come in contact with an outer surface of the door panel, and comes in contact with a vehicle body panel so as to be deflected and deformed in a door closed state; and a connection part which is made of a soft rubber, and connects the base bottom portion of the hollow seal part with the attachment base part, wherein a hard rubber is buried to each of insides of the base bottom portion of the hollow seal part and the connection part such that the hard rubber of the base bottom portion is continued to the hard rubber of the connection part.

According to the present invention, the curve-shaped deflection and deformation of the door weather strip at the time of molding is suppressed, and the reduction of the seal pressure between the base bottom portion of the hollow seal part and the door panel is suppressed, thereby suppressing the deterioration of attachment work efficiency and seal performance to the door panel.

DETAILED DESCRIPTION

In the following, an embodiment of a door weather strip of the present invention will be explained in detail based on the drawings.

Figure 1:
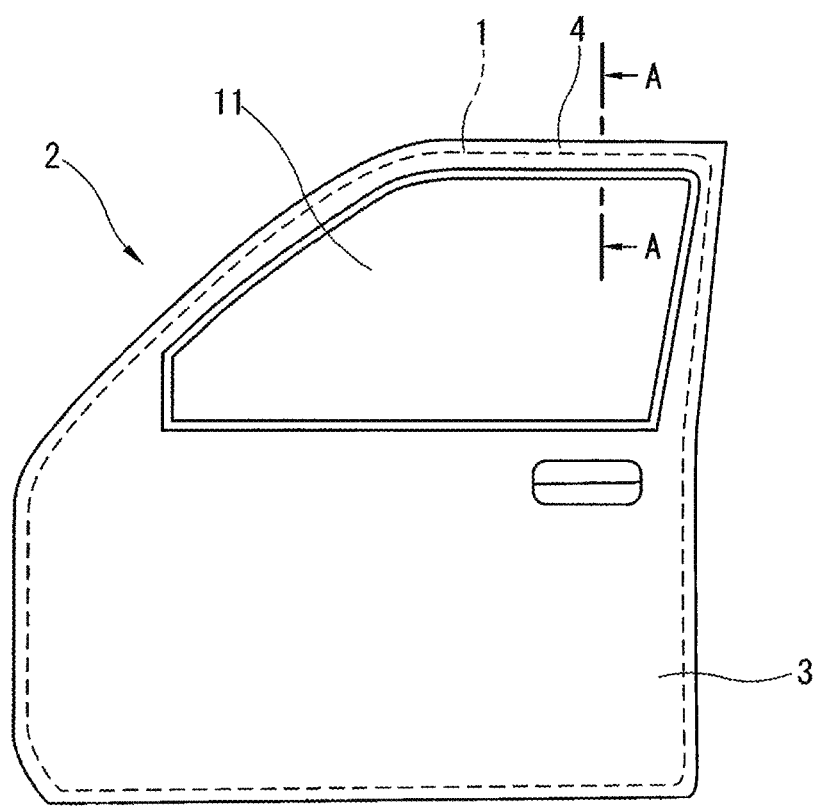
FIG. 1 is a side view of a front door of an automobile to which a door weather strip of the present invention or a door weather strip of the conventional technique is applied.
Figure 2:
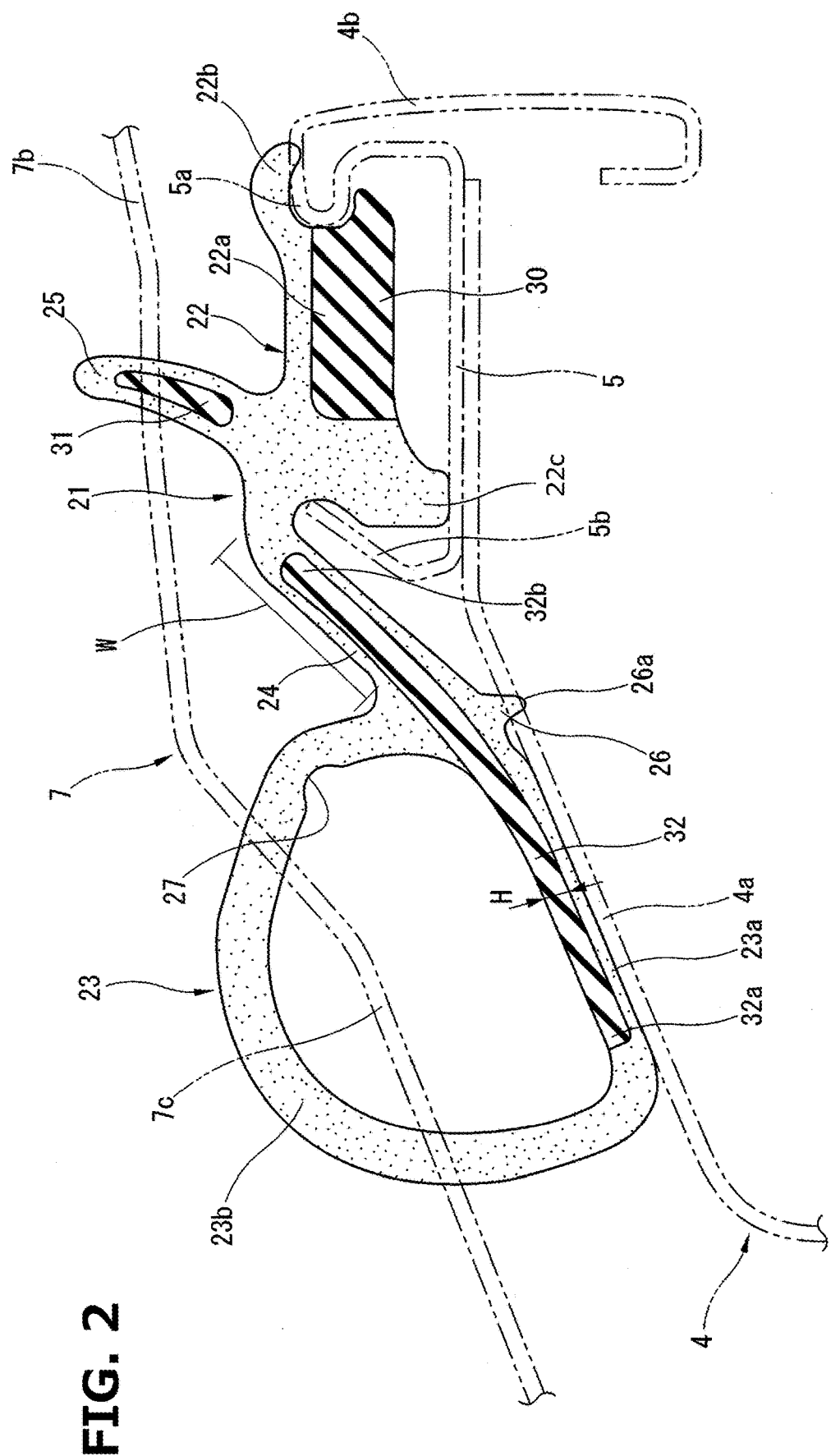
FIG. 2 is a sectional view taken along an A-A line of FIG. 1, and there is shown one embodiment of the door weather strip according to the present invention.
Figure 3:
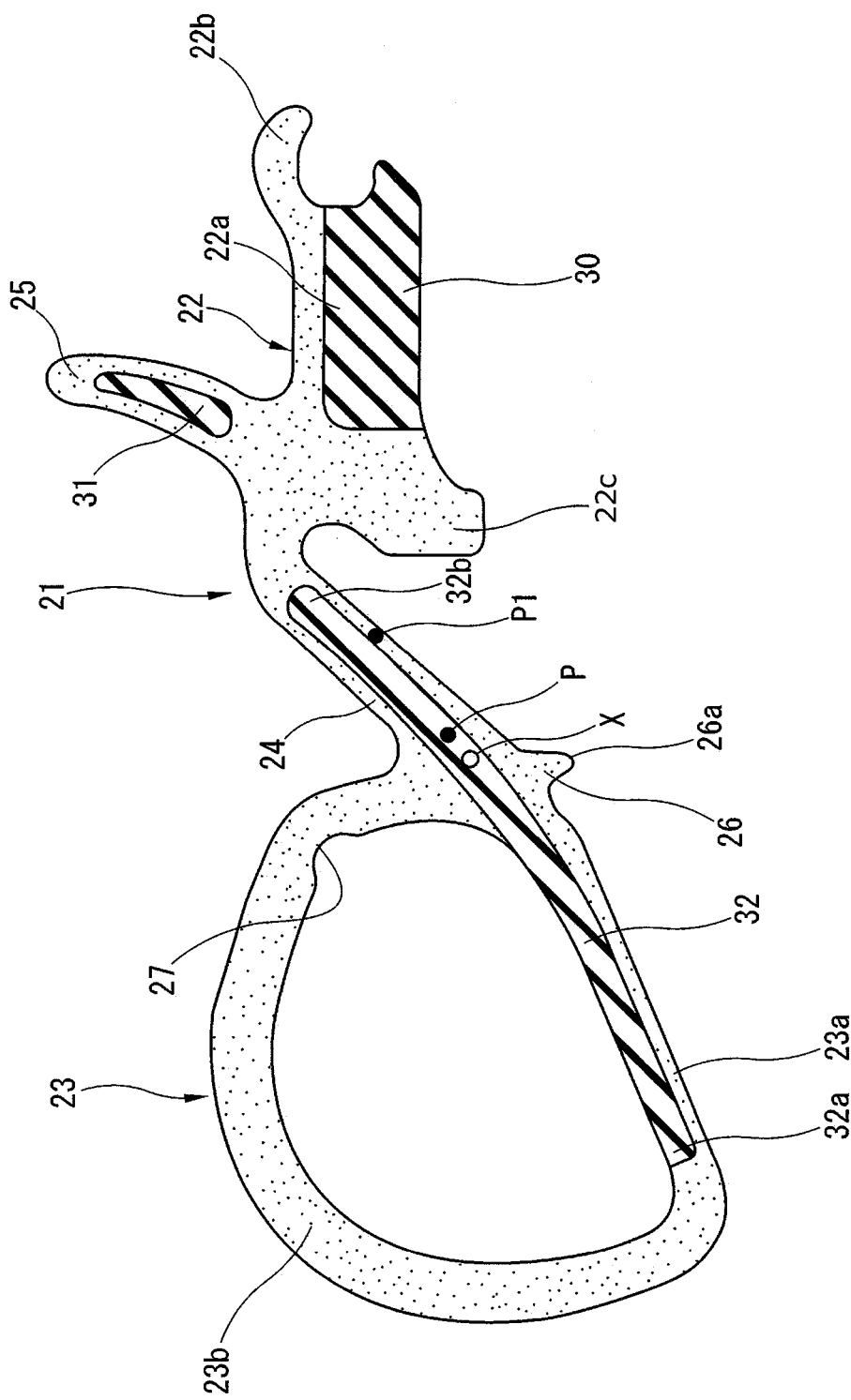
FIG. 3 is a sectional view, and there is shown the center of the FIG. and the centroid position of the door weather strip of the present embodiment.
Figure 4:
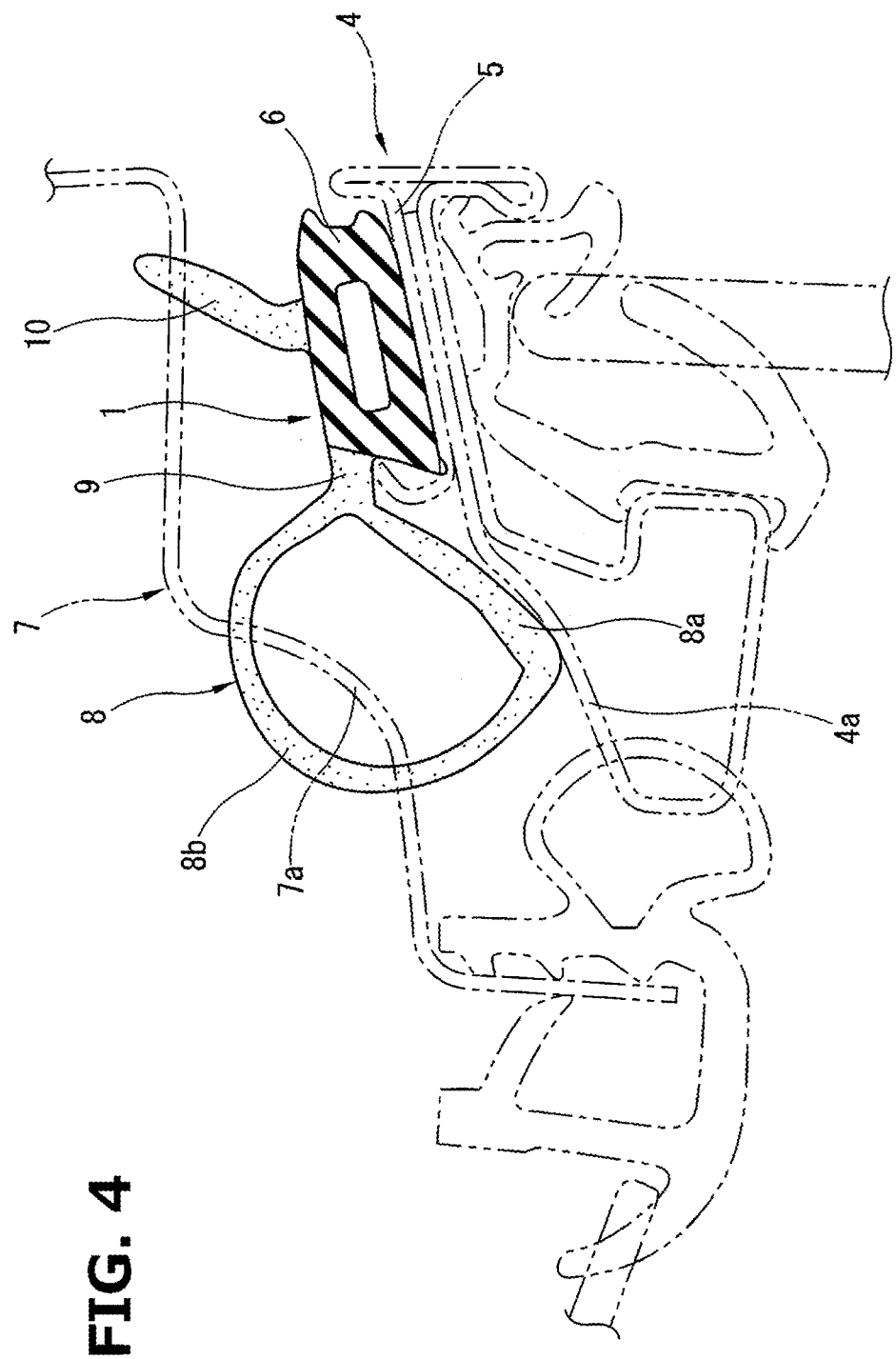
FIG. 4 is a sectional view taken along an A-A line of FIG. 1, and there is shown a conventional door weather strip.

FIG. 2 is a sectional view taken along an A-A line of FIG. 1, and there is shown one embodiment of a door weather strip according to the present invention. FIG. 3 is a sectional view, and there is shown the center of the figure and the centroid position of the door weather strip in the present embodiment.

A door sash part 4 provided on the upper part of a door main body 3 of a front door 2 in an automobile which is a vehicle is formed by roll forming, and, as shown in FIG. 2, is formed with, on the vehicle inner side of a door inner panel 4a, a mold channel 4b, and a retainer 5 serving as an attachment portion is provided more on the vehicle outer side than the mold channel 4b. In addition, a run channel (not shown) on which an end portion of a door glass is slidably held is attached to the lower part of the retainer 5.

The retainer 5 includes a protrusion 5a having a substantially U-shape in cross section at one end portion in the width direction on the mold channel 4b side, and a support piece 5b at the other end in the width direction so as to rise up from the bottom wall toward the vehicle inside direction at an inclined angle, with a substantially V-shape in cross section.

A door weather strip 21 for sealing between a door and a vehicle body opening by coming in elastic contact with the outer surface of a body-side outer panel 7 which is a vehicle body panel in a door closed state is attached to the outer periphery of the door sash part 4.

The body-side outer panel 7 includes a stepped portion 7c having a level difference from a roof portion 7b side toward the left direction in FIG. 2 while being inclined toward the lower side. In addition, a seal member which is not shown is held on the distal end portion side of the stepped portion 7c.

As shown in FIG. 2, the door weather strip 21 includes an attachment base part 22 attached and fixed by being fitted to the inside of the retainer 5 of the door sash part 4, a hollow seal part 23 which is provided on the vehicle-outer-side end portion side of the attachment base part 22, and has a base bottom portion 23a disposed so as to come in contact with the upper surface of the door inner panel 4a, and a connection part 9 which connects the base bottom portion 23a of the hollow seal part 23 and the attachment base part 22.

As shown in FIGS. 2 and 3, the attachment base part 22 includes a main body 22a formed to have a rectangular shape in cross section, a fitting portion 22b which is integrally provided at one end portion on the vehicle inner side in the width direction of the main body 22a so as to be fitted to the protrusion 5a of the retainer 5, and has a substantially C-shape in cross section, and a protrusion portion 22c which is provided at the other end portion on the vehicle outer side in the width direction of the main body 22a, is fitted to and supported on the support piece 5b of the retainer 5, and has a substantially rectangular shape in cross section.

The material of the attachment base part 22 is basically a foaming sponge rubber which is soft rubber such as EPDM (part in which dots are drawn in the drawings). On the other hand, the lower end part of the main body 22a and the lower part of the fitting portion 22b is formed by a solid rubber 30 made of hard rubber (part shown by thick hatched lines). That is, in the attachment base part 22, although the upper end part of the main body 22a, the upper part of the fitting portion 22b and the protrusion portion 22c are made of sponge rubber, the lower end part of the main body 22a and the lower part of the fitting portion 22b are formed by the solid rubber 30.

In addition, a sub lip 25 which comes in elastic contact with the outer surface of the body-side outer panel 7 in a door closed state is integrally provided at the upper end on the protrusion portion 22c side of the main body 22a of the attachment base part 22. Although the material of the sub lip 25 is sponge rubber, a solid rubber 31 is buried thereinside. In the sub lip 25, the rigidity of the whole of the sub lip 25 is ensured by the solid rubber 31 buried thereinside.

The hollow seal part 23 includes the substantially linear base bottom portion 23a disposed so as to come in contact with the upper surface of the door inner panel 4a, and an circular arc portion 23b which is integrally provided at the upper end portion of the base bottom portion 23a, and is deflected and deformed when being brought into elastic contact with the body-side outer panel 7 in a door closed state. In the hollow seal part 23, the basic material of the whole of the base bottom portion 23a and circular arc portion 23b is sponge rubber.

The connection part 24 extends from the other end portion on the vehicle outer side in the width direction of the main body 22a of the attachment base part 22 to the end edge of the base bottom portion 23a of the hollow seal part 23 such that a length W in the width direction of the connection part 24 becomes relatively long, and is formed in a belt-like shape along the longitudinal direction of the door weather strip 21. In addition, the basic material of the connection part 24 is sponge rubber.

In addition, the length W in the width direction of the connection part 24 is not limited to that in the present embodiment, and can be set so as to be shorter or longer in accordance with a mode and a size.

Then, a solid rubber 32 which is hard rubber is buried to the inside of each of the base bottom portion 23a of the hollow seal part 23 and the connection part 24. The solid rubber 32 is continuously formed from the base bottom portion 23a to the inside of the connection part 24, and the whole of the solid rubber 32 is formed in a substantially linear shape slightly expanded toward the door inner panel 4a. In addition, the solid rubber 32 is formed so as to have a thickness H which is approximately two-thirds of the whole thickness of the base bottom portion 23a, and an one end portion 32a on the distal end side in the width direction of the solid rubber 32 extends to the vicinity of the outer end portion of the circular arc portion 23b of the base bottom portion 23a. On the other hand, an other end portion 32b extends to the vicinity of the attachment base part 22 of the connection part 24.

In the present embodiment, although the solid rubbers 30, 31 and 32 are used as hard rubber, hard foaming rubber having a specific gravity of 0.7-1.2 can also be used.

In addition, in the solid rubber 32, on the base bottom portion 23a side, the upper surface of the solid rubber 32 is exposed to the inside on the circular arc portion 23b side. On the other hand, on the connection part 24 side, the solid rubber 32 is arranged in the center of the inside of the connection part 24 such that the whole of the solid rubber 32 is covered with sponge rubber.

In addition, a seal bead 26 is provided at the lower surface of the joint part with the connection part 24 of the base bottom portion 23a. The seal bead 26 is formed in a substantially triangle in cross section, and extends along the longitudinal direction of the hollow seal part 23, and a distal end edge 26a at the top portion of the seal bead 26 comes in contact with the upper surface of the door inner panel 4a.

In addition, the circular arc portion 23b is formed with, on the inner surface on the attachment base part 22 side, a notch portion 27 which serves as a bending point at the time of elastic contact with the body-side outer panel 7 in a door closed state.

[Working Effect of Door Weather Strip According to the Present Embodiment]

When the door weather strip 21 of the present embodiment is attached to the door sash part 4, the main body 22a of the attachment base part 22 is fitted to the inside of the retainer 5, the fitting portion 22b is fitted to and held on the protrusion 5a of the retainer 5, and the protrusion portion 22c is fitted to and engages with the inside of the support piece 5b of the retainer 5. With this, the attachment base part 22 is fitted to and supported on the inside of the retainer 5, thereby particularly suppressing coming-off of the attachment base part 22 toward the upper side by the support piece 5b.

Therefore, the door weather strip 21 is firmly attached to the door sash part 4 via the attachment base part 22 and the retainer 5. In addition, the attachment base part 22 can also be attached to the retainer 5 by using a clip which is not shown in the drawings.

In this way, in a state in which the door weather strip 21 has been attached to the door sash part 4, the hollow seal part 23 is deflected toward the door inner panel 4a with the joint position with the attachment base part 22 of the connection part 24 as a fulcrum, and the bottom surface of the base bottom portion 23a comes in contact with the upper surface of the door inner panel 4a, and the distal end edge 26a of the seal bead 26 also comes in contact with the upper surface of the door inner panel 4a.

In particular, since the solid rubber 32 is buried to the insides of the base bottom portion 23a and the connection part 24 such that the rigidity of the base bottom portion 23a and the connection part 24 is increased, a contact force to the upper surface of the door inner panel 4a is increased. That is, in the base bottom portion 23a and the connection part 24, the entire rigidity including the joint rigidity is enhanced by the solid rubber 32, and the substantially linear shape between the base bottom portion 23a and the connection part 24 is stably kept after being attached to the door sash part 4, as a result of which the base bottom portion 23a can be brought into press-contact with the upper surface of the door inner panel 4a without occurrence of the floating of the base bottom portion 23a from the door inner panel 4a.

Moreover, since the rigidity of the base bottom portion 23a and the connection part 24 is increased, the distal end edge 26a of the seal bead 26 can also come in press-contact with the upper surface of the door inner panel 4a. Therefore, the sealing performance between the base bottom portion 23a and the seal bead 26 and the upper surface of the door inner panel 4a is improved.

In addition, when the front door 2 is closed, the outer surface at the distal end portion of the circular arc portion 23b of the hollow seal portion 23 comes in elastic contact with the outer surface at the stepped portion 7c of the body-side outer panel 7, and the circular arc portion 23b is deflected and deformed, with the notch portion 27 as a bending point, toward the direction in which the whole of the circular arc portion 23b is pressed by the pressing force of the front door 2. With this, the sealing between the hollow seal part 23 and the lower surface of the stepped portion 7c of the body-side outer panel 7 is effectively achieved.

Figure 5:
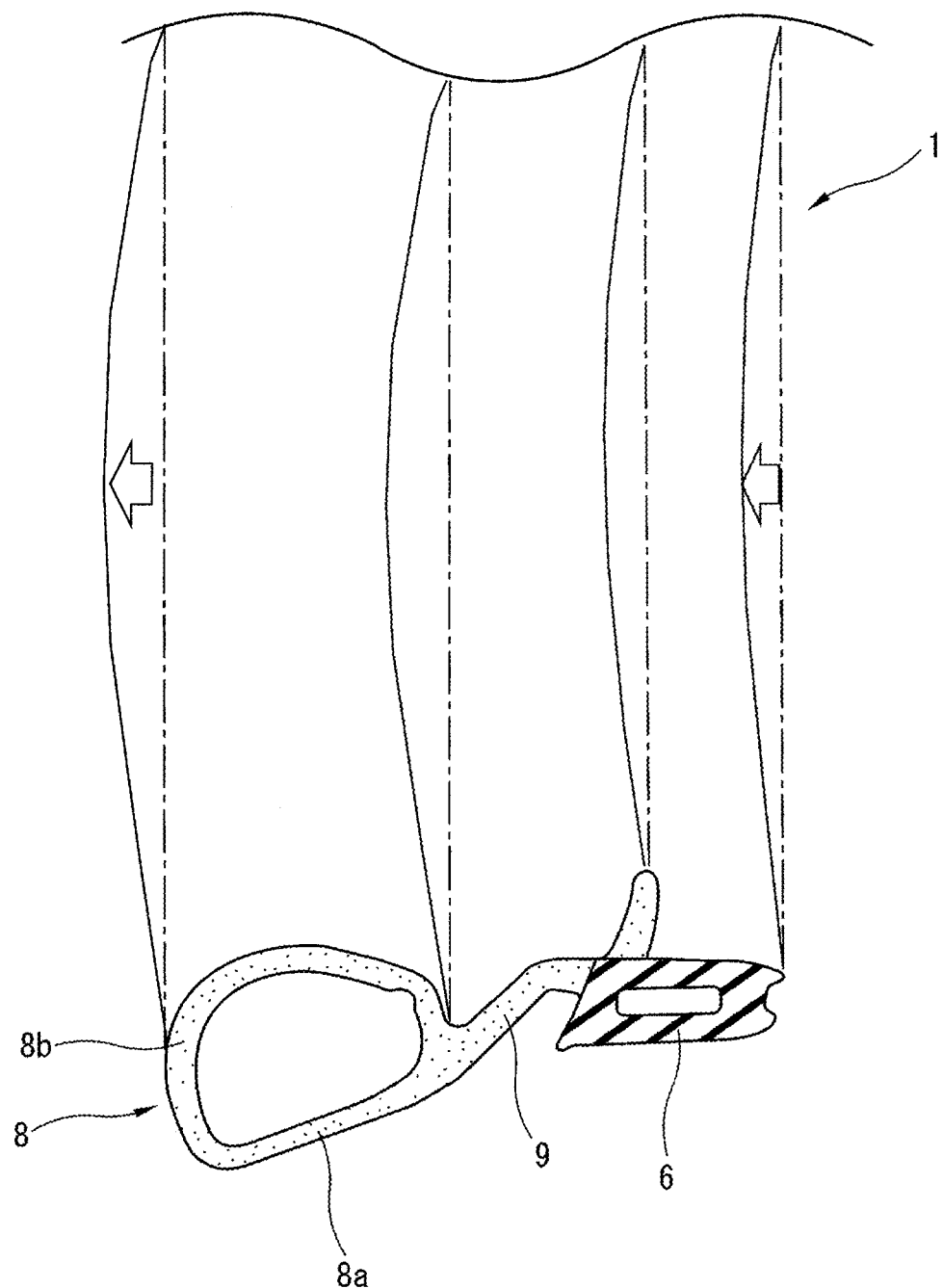
FIG. 5 is an illustrative view, and there is shown the conventional door weather strip which has been deflected and deformed in one direction.

Then, as mentioned above, since the rigidity of the base bottom portion 23a of the hollow seal part 23 and the connection part 24 is increased by the solid rubber 32, after the lapse of a long time after the molding of the door weather strip 21 or immediately after the extrusion molding of the door weather strip 21, the deflection and deformation in one direction in a free state before the attachment to the retainer 5 due to foaming density difference between sponge rubber and solid rubber can be suppressed. That is, it is possible to sufficiently suppress the occurrence of the deflection and deformation in one direction of the door weather strip 21, which is shown by an arrow, in a free state as shown in FIG. 5 in case where the hollow seal part 23 and the connection part 24 are made of only sponge rubber as shown in the conventional technique.

Consequently, the deterioration of the efficiency of attachment work of the door weather strip 21 to the door sash part 4 by hand can be suppressed.

Moreover, since the solid rubber 32 is buried inside the base bottom portion 23a of the hollow seal part 23 and connection part 24, the area of the whole solid rubber including the solid rubber 30 forming a part of the main body 22a of the attachment base part 22 can be dispersed. Consequently, as shown in FIG. 3, since the solid rubber is buried, the centroid position of the door weather strip 21 (black dot P1 in FIG. 3) in case of being made of only sponge rubber can be shifted to a position shown by a black dot P in FIG. 3 which is close to the center of the figure of the door weather strip 21 (white dot X in FIG. 3). With this, the position shifting between the figure center X and the centroid position P can be sufficiently suppressed, and thereby the balance of the foaming rubber in the whole cross section of the door weather strip 21 can be substantially equalized. Consequently, as compared with the conventional technique, the occurrence of the deflection and deformation in one direction at the time of, for example, extrusion molding of the door weather strip 21 can be suppressed further.

In addition, in the conventional door weather strip described in JP 4511149 B2, in a door closed state, there is a possibility that, in the hollow seal part, the base bottom portion side floats from the upper surface of the descending portion with the connection part side as a fulcrum due to the deterioration of the rigidity. Consequently, door closing performance deteriorates due to the floating in the door closed state, and external appearance deteriorates.

In contrast to this, in the present embodiment, in a door closed state, the reaction force at the time when the circular arc portion 23b of the hollow seal part 23 comes in elastic contact with the body-side outer panel 7 is transmitted to the base bottom portion 23a, and the base bottom portion 23a can be brought into press-contact with the upper surface of the door inner panel 4a. Consequently, the deterioration of door closing performance due to the floating of the base bottom portion 23a in the door closed state can be suppressed, and external appearance can be improved.

In addition, as a recent door structure of an automobile, in order to improve the appearance quality and to change the structure of the door sash part 4, a connection part 24 as shown in the present embodiment is provided, and a length W in the width direction of the connection part 24 is elongated. However, in case of molding the connection part 24 with sponge rubber, it may cause technical problems such as the deterioration of the attachment workability and sealing performance of the door weather strip 21 mentioned above.

However, in the present embodiment, even if the connection part 24 is formed so as to be wide, since the solid rubber 32 is buried to the insides of the base bottom portion 23a of the hollow seal part 23 and connection part 24, the technical problems such as the deterioration of the attachment workability and sealing performance can be solved.

The present invention is not limited to the configuration of the embodiment mentioned above, and each configuration in the door weather strip can further be changed according to the spirit of the present invention. For example, the whole of the attachment base part 22 can be formed by the solid rubber 30. In addition, the thickness and the width length of the solid rubber 32 buried to the insides of the base bottom portion 23a of the hollow seal part 23 and connection part 24 can be arbitrarily changed.

In addition, although the door weather strip is applied to a front door in the present embodiment, it can also be applied to a rear door.

The following summarizes features of the present embodiment.

In one aspect of the present invention, a door weather strip includes: an attachment base part which is attached to a door panel of a vehicle, and has at least a part made of a hard rubber; a hollow seal part which is made of a soft rubber, has a base bottom portion disposed so as to come in contact with an outer surface of the door panel, and comes in contact with a vehicle body panel so as to be deflected and deformed in a door closed state; and a connection part which is made of a soft rubber, and connects the base bottom portion of the hollow seal part with the attachment base part, wherein a hard rubber is buried to each of insides of the base bottom portion of the hollow seal part and the connection part such that the hard rubber of the base bottom portion is continued to the hard rubber of the connection part.

In addition, the connection part extends from the attachment base part toward the base bottom portion of the hollow seal part so as to be formed wide.

In addition, each of the hard rubbers is a solid rubber or a hard foaming rubber having a specific gravity of 0.7-1.2, and each of the soft rubbers is a sponge rubber.

In addition, a seal bead which comes in contact with an upper surface of the door panel is provided at a lower surface of a joint part between the base bottom portion of the hollow seal part and the connection part so as to protrude therefrom, and the seal bead extends along a longitudinal direction of the hollow seal part.

The entire contents of Japanese Patent Application 2022-150911 filed Sep. 22, 2022 is incorporated herein by reference.

Although the present invention has been described with reference to the present embodiment and its variations, the present embodiment and its variations are intended to facilitate understanding of the present invention and are not intended to limit the present invention thereto. Various changes and modifications may be made to the present embodiment and its variations without departing from the scope of the present invention. The present invention includes equivalents thereof.

The invention claimed is:

1. A door weather strip comprising:
    an attachment base part which is attached to a door panel of a vehicle, and has at least a part made of a first rubber;
    a hollow seal part which is made of a second rubber softer than the first rubber, the hollow seal part having a base bottom portion disposed so as to come in contact with an outer surface of the door panel and a circular arc portion which is integrally formed with an upper end portion of the base bottom portion, the circular arc portion structured to contact a vehicle body panel so as to be deflected and deformed in a door closed state; and
    a connection part which is made of the second rubber, and connects the base bottom portion of the hollow seal part with the attachment base part,
    wherein the first rubber is buried inside each of the base bottom portion of the hollow seal part and the connection part such that a portion of the first rubber in the base bottom portion is connected to a portion of the first rubber in the connection part while disconnected from the first rubber of the attachment base part;
    wherein a first end portion on a distal end side in a width direction of the first rubber within the base bottom portion extends to and is contained in an area defined within an outer end portion of the circular arc portion of the base bottom portion, the area limited to a segment of the outer end portion disposed to directly contact the outer surface of the door panel, and a second end portion of the first rubber within the connection part extends to a vicinity of the attachment base part within the connection part, and
    wherein an upper surface of the first rubber of the base bottom portion forms an interior surface of the circular arc portion.

2. The door weather strip according to claim 1, wherein the connection part extends from the attachment base part toward the base bottom portion of the hollow seal part so as to define a width of the connection part.

3. The door weather strip according to claim 1, wherein the first rubber buried inside each of the base bottom portion and the connection part is a solid rubber or a hard foaming rubber having a specific gravity of 0.7-1.2, and
    wherein the second rubber of each of the hollow seal part and the connection part is a sponge rubber.

4. The door weather strip according to claim 1, wherein a seal bead which comes in contact with an upper surface of the door panel is provided at a lower surface of a joint part between the base bottom portion of the hollow seal part and the connection part so as to protrude therefrom, and
    wherein the seal bead extends along a longitudinal direction of the hollow seal part.

* * * * *